Oct. 16, 1962 R. O. SILBERBACH 3,059,109

VEHICLE RADIO USING ZENER DIODES TO BOTH REGULATE AND FILTER THE BIAS VOLTAGE SUPPLY

Filed Sept. 11, 1959

INVENTOR.
Richard O. Silberbach

BY Mueller & Aichele

Attys.

3,059,109

VEHICLE RADIO USING ZENER DIODES TO BOTH REGULATE AND FILTER THE BIAS VOLTAGE SUPPLY

Richard O. Silberbach, Chicago, Ill., assignor to Motorola, Inc., Chicago, Ill., a corporation of Illinois
Filed Sept. 11, 1959, Ser. No. 839,509
2 Claims. (Cl. 325—318)

Figures 1, 2:
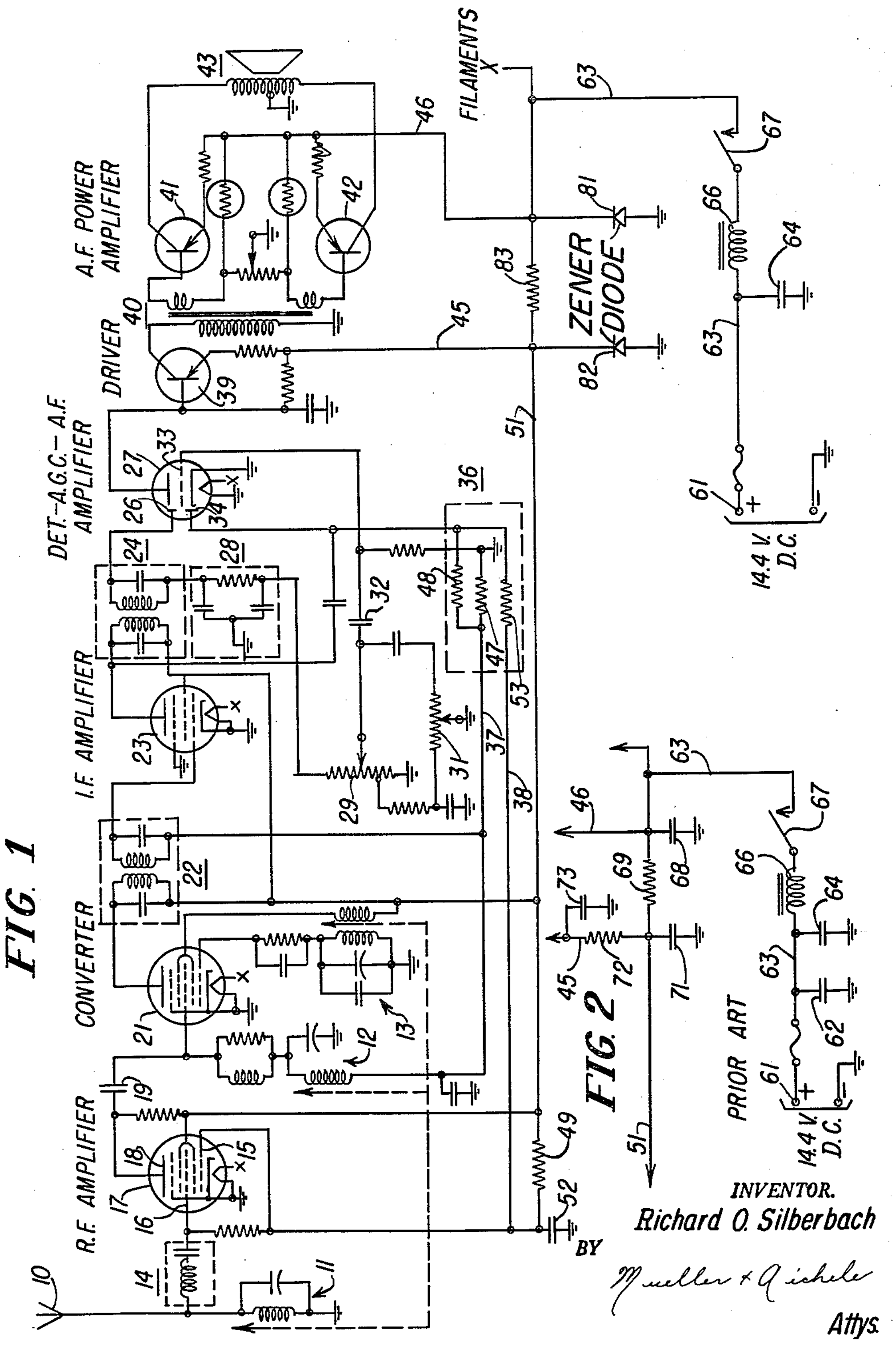

This invention relates to electric circuits of the type employed in radio receiving systems for suppressing interference and stabilizing voltages, and is more particularly directed to a noise filter and voltage regulator circuit for use in vehicle radio receivers designed to operate directly on the low voltages supplied by the direct current vehicle electrical system.

Problems have been encountered in adapting radio receivers for operation in automobiles or the like since it is preferred to energize such radio receivers from the low voltage direct current electrical system of the automobile and receivers have normally required high voltage for proper operation. Although the auto industry in recent years has standardized on 12 volt (nominal) systems in place of 6 volt systems, these higher voltage systems still represent a relatively low voltage environment for radio receivers. Receivers have recently been designed, however, which do operate successfully on low voltage and these are all transistor receivers or a receiver known as a "hybrid" and including both tubes and transistors as described and claimed in Race Patent No. 2,810,071.

Other problems still remain, however, in further improving a radio receiver for operation directly from vehicle electrical systems. The direct current output voltage of such systems commonly varies as a result of generator output varying with changes in engine speed, load changes in the system, and changes in the condition of the automobile storage battery with temperature and age. These influences may cause the voltage to range anywhere from 12 to 15 volts, this variation being in the nature of a gradual or steady state condition and occurring despite the presence of an automobile voltage regulator. Up to now it has not been practical to provide means for completely isolating the receiver from the effects of this voltage variation and consequently present auto radio receivers are subject to being detuned when the voltage supplied to the local oscillator therein is allowed to vary. This condition becomes even more serious for completely transistorized radio receivers due to the lower inherent stability of transistor oscillators compared to vacuum tube oscillators.

Another problem encountered in providing radio receiving installations in automobiles is the suppression of electrical interference existing in the automobile electrical system. Such interference may cover a wide range of frequencies from a few cycles per second on up to the megacycle range and commonly results from the operation of the breaker points in the ignition system, from switch and key clicks as well as from other periodical or stray electrical noises picked up and conducted by the automobile electrical system. Interference in the audio frequency range will, of course, be amplified and reproduced by the radio receiver unless it is isolated from the receiver stages. Interference above and below the audio range may be equally undesirable due to the possibility of blocking the first receiver stage. To overcome ignition noise and the like it is common practice to provide a power supply filter in the radio receiver composed of several capacitor and inductor components which necessarily contribute to the physical size, weight and expense of the overall receiver.

It is, therefore, an object of the present invention to provide an improved electrical circut for regulating as well as filtering direct current voltages.

It is another object to provide an improved power supply filter circuit for radio receivers for suppressing undesirable electrical interference ranging in frequency from about 30 cycles per second and above while also providing a regulated direct current output.

A further object is to provide an improved voltage regulator which is suitable for incorporation into the power supply of vehicle radio receivers of the type designed to operate directly without step-up converters on low direct current voltages supplied by the vehicle electrical system, said regulator thereby providing voltage regulation for the entire receiver and thus insuring a high degree of voltage stability for the receiver oscillator in spite of variations in the vehicle generator output and in the load of the electrical system.

A still further object is to provide a noise filter for vehicle radio receivers which utilizes the Zener effect of semiconductor devices to provide improved alternating current attenuation over a wide range of frequencies, yet which is more compact, more reliable and which utilizes fewer components than prior art filters.

A feature of the present invention is the provision of an improved electrical circuit which includes a Zener effect device, such as a semiconductor junction diode, connected in series with an impedance element which will conduct direct current, the diode and impedance element being connected across a source of direct current power with the diode poled in an ordinarily nonconductive manner with respect to direct current. A diode is used having a predetermined inverse breakdown voltage lower than the potential at the point where these series elements are connected across the power source so that the diode conducts continuously in the reverse direction with a Zener breakdown impedance.

The foregoing and other objects, features, and advantages of the invention will be apparent from a study of the following description thereof taken in connection with the accompanying drawing, wherein:

FIG. 1 is a circuit diagram of an automobile radio receiver of the hybrid type including a filter and regulator circuit in accordance with the invention; and FIG. 2 is a circuit diagram of a conventional prior art filter network commonly used for receivers of the type shown in FIG. 1.

The invention provides a combined filter and regulator network well suited for operation in a radio receiver energized directly from a low voltage direct current power source without voltage step-up. In a particular form the system includes capacitor means, which may be shunt connected across the power input lead and chassis ground, for filtering high frequency components of electrical interference. Series coupled with the power input lead are a filter choke and a resistor which conduct receiver current therethrough. Zener diodes are coupled from the respective low potential sides of the choke and resistor to chassis ground and are reverse poled with respect to the potential thereacross. These diodes have predetermined Zener breakdown voltage characteristics such that continuous reverse conduction occurs therethrough as the direct current potential applied across the series circuit ranges between given minimum and maximum values. Such gradual direct current voltage variations as well as a broad range of interference frequency voltages are developed primarily across the choke and resistor. Thus, a voltage regulated as well as fully filtered direct current output is provided from the power source by connecting load conductors, such as the B+ and ground terminals of a radio receiver, across the diodes of the network.

Referring now to the drawing, the receiver of FIG. 1 includes an antenna 10 which supplies modulated radio frequency signals to a tuned circuit 11 gang-tuned with a tuned circuit 12 and a local oscillator tuned circuit 13. The modulated radio frequency signal is applied from the tuned circuit 11 through an antenna spark choke-capacitor 14 to the grid 16 of vacuum tube 17 in the radio frequency amplifier stage. The output of tube 17 is coupled from plate 18 thereof through coupling capacitor 19 to the tuned input circuit 12 and applied to the control grid of mixer-oscillator vacuum tube 21 in the converter stage. Local oscillations for the converter stage are controlled by oscillator tuned circuit 13, and this stage converts the modulated radio frequency by heterodyne action to a modulated intermediate frequency of, for example, 262.5 kilocycles per second. This intermediate frequency signal is selected by the tuned transformer coupling system 22 and impressed on vacuum tube 23 in the intermediate frequency amplifier stage. The amplified intermediate frequency output of tube 23 is in turn transformer coupled through tuned transformer circuit 24 to diode plate 26 of vacuum tube 27 in the detector-automatic gain control-audio frequency amplifier stage. The detected audio frequency signal is developed in network 28 and across volume control potentiometer 29, the frequency range of the developed audio signal being adjustable by means of the tone control 31 associated with volume control 29. The volume and tone controlled portion of the detected audio signal is then coupled through capacitor 32 to the control grid 33 and is amplified by tube 27.

Automatic gain control for each of the preceding stages is developed through a voltage divider network 36 connected to plate 34 of tube 27, the desired AGC signal voltage being applied through AGC leads 37 and 38 to the respective input circuits (control grids) of the preceding stages.

The output circuit of tube 27 is directly connected to the base of driver stage transistor 39 so that the D.C. potential at the base of transistor 39 serves as an operating or exciting potential for the anode of tube 27. Changes in the plate resistance corresponding to received signals alter the current through the base of transistor 39 to provide an input signal for this transistor. The amplified output current of transistor 39 is fed through the primary winding of current step-up coupling transformer 40. The secondary windings of transformer 40 are respectively connected across the base and emitter of transistors 41 and 42 in the push-pull audio frequency power amplifier stage (operated Class B) so that an induced input signal current is supplied to each transistor with a phase difference of 180 degrees. These signal currents are amplified by transistors 41 and 42 and the resulting output current is fed through the voice coil of loudspeaker 43 to directly drive the loudspeaker.

The above-described radio receiver is of the type commonly referred to as a "hybrid" receiver since it utilizes both vacuum tubes and transistors. Such a radio receiver is particularly described in the aforementioned United States patent issued to Richard T. Race, assignor to the assignee hereof. Such hybrid radio receivers have eliminated the need for the vibrators and step-up transformers previously used to generate high voltages for energizing power amplifying vacuum tubes. They operate directly from the low voltage (e.g. 12 volt D.C. nominal) electrical system of present day automobiles by using vacuum tubes in the high frequency and voltage amplifier stages while using transistors in the driver and power amplifier stages. For example, in a commercial receiver employing the above-described circuitry the radio frequency amplifier vacuum tube 17 operates on 7.8 volts (±10%) potential difference between the plate 18 and chassis ground with no signal input. Similarly, the converter stage vacuum tube 21 and intermediate frequency amplifier vacuum tube 23 operate with plate voltages of 11.8 volts (±10%), the above voltages being applied through the common B+ lead 51 to the aforementioned tubes. In the transistorized driver and push-pull audio frequency power amplifier stage satisfactory operation results when 12 volts and 13.9 volts (±10%) respectively are applied between the emitters of transistors 39, 41 and 42 and chassis ground by means of leads 45 and 46 respectively.

One feature which improves direct operation, without voltage step-up, from the battery-generator electrical system of an automobile is the manner of providing automatic gain control from the voltage divider network 36 to the control grid 15 of vacuum tube 17. The negative voltage developed across resistors 47 and 48 and appearing on lead 38 is highere than desired for full gain operation of the radio frequency stage at low signal levels. To counteract this, a large bleeder resistor 49 is connected between lead 38 and B+ lead 51 and this has a resistance sufficient to reduce the negative bias on grid 15 of tube 17. This will allow the gain of the stage to be at a maximum during reception of weak signals, while during reception of strong signals the AGC voltage developed across network 36 will override the effect of the bleeder resistor 49 to increase the negative bias and thereby reduce the gain of the stage. A capacitor 52 and the resistor 53 form a filter which removes radio and audio frequency signals and provides the desired time constant for the AGC circuits.

Before completing the description of the circuit of FIG. 1, it is believed that a description of a conventional prior art filter circuit, as shown in FIG. 2, will provide a better understanding of the invention. To energize the receiver, terminal 61 is connected to the positive lead from the electrical system of the automobile (not shown). This system in present day automobiles may provide a direct current voltage of about 14.4 volts (nominal). Although this is a high enough potential to operate the above described radio receiver without voltage step-up, it is not an ideal source of power for receiver operation due to several factors previously mentioned.

In order to suppress or filter the undesirable interference from the direct current voltage of the system, the radio receiver is customarily provided with a filter network located intermediate input terminal 61 and the B+ leads. A relatively large capacitor 62, commonly referred to as a "spark plate," is connected between the power lead 63 and the chassis, the latter being established at ground or reference potential, so that the high frequency components of electrical interference which may exist at terminal 61 are effectively by-passed to the point of reference potential. The capacity of spark plate 62 must be as high as practicable, and it must have a relatively large mechanical construction in order to have a negligible inductive value to provide a low impedance path for high frequencies. Capacitor 64 is connected in shunt with spark plate 62 to increase the effective noninductive capacitance of the spark plate. To aid in filtering a filter choke 66 is connected in series with lead 63 to pass D.C. readily while presenting a large A.C. impedance to the high frequency components. If such provision were not made for eliminating interference, those components having a frequency in the upper audio range would be heard as static from the receiver loudspeaker. Furthermore, in the radio receiver of FIG. 1 these components as well as those above the audible range could reach tube 17 through the connection provided by resistor 49 between grid 15 and the line 51 and thereby cause blocking of the radio frequency amplifier stage.

When series switch 67 is closed the receiver will be energized with direct current through lead 63, which at this point may still contain undesirable low frequency components of electrical interference. To eliminate these low frequency components an electrolytic capacitor 68 is connected between the junction of lead 63 with lead 46 and chassis ground. Capacitor 68 has a capacitance on the order of 100 microfarads so that sufficient attenuation or filtering of the low frequency interference is provided for the push-pull power amplifier stage. The effects of interference are more critical for the preceding stages of the receiver and therefore more low frequency filtering is provided by an RC circuit consisting of resistor 69 having a resistance of 120 ohms and which is connected in series with another electrolytic capacitor 71 connected in turn to the reference point. Capacitor 71 may have a capacitance on the order of 400 microfarads. Lead 51 is connected to the junction of resistor 69 with capacitor 71 to supply the filtered direct current to tubes 17, 21 and 23. Further filtering action for the transistorized audio driver stage is provided by the RC decoupling network consisting of resistor 72 and capacitor 73, lead 45 being connected between the junction of resistor 72 with capacitor 73 and the emitter of transistor 39.

Although the prior art filters may provide acceptable attenuation of electrical interference, they do not provide a means of overcoming the voltage variation problems encountered when energizing receivers from vehicle electrical systems. The steady state or gradual voltage fluctuations occur too slowly to be stabilized by the conventional filtering system. Consequently they are ordinarily permitted to pass unregulated through the prior art filter systems such as that described in FIG. 2 Voltage variations in lead 51 will be reflected across the feedback winding of oscillator 13 in the converter stage, where the effect is to change the resonant frequency of the oscillator and thereby detune the receiver. This detuning effect becomes even more critical for all-transistor receivers since transistor oscillators are inherently less stable than vacuum tube oscillators.

Referring again to FIG. 1, there is shown a filter network in accordance with the invention which provides improved filtering action over the prior art filter discussed above and which also overcomes the serious problem of voltage instability. Where identical filter elements occur in FIGS. 1 and 2, they are given the same numerals and their description not repeated. As shown in FIG. 1, it is possible to eliminate the spark plate 62. Another difference between the disclosed embodiment and the prior art resides in the portion of the filter network corresponding to that portion of the prior art filter provided to perform the filtering of the lower frequency components of electrical interference. A Zener effect device, such as a Zener diode 81, is reverse poled in a normally nonconductive manner for direct current and connected between the junction of power lead 63 with lead 46 and the reference point. In addition, another Zener effect device, such as a Zener diode 82, is connected in series with a direct current conducting impedance means or resistor 83, this series circuit being connected across the junction of lead 63 with diode 81 and the reference point. Diode 82, like diode 81, is poled for reverse conduction of direct current flowing in line 63. B+ leads 45 and 51 are connected at the junction of resistor 83 and diode 82 to supply the B+ potential to all but the power amplifier stage of the receiver, and lead 46 connects this last stage to the junction of lead 63 and diode 81 to supply it with operating potential.

The functioning of the filter network in accordance with the invention is dependent upon the phenomenon called the Zener effect, a well known property of, for instance, semiconductor devices having two contiguous zones of semiconductor materials of opposite conductivity type, commonly known as P–N junctions. Up to a predetermined maximum voltage these devices will permit substantial conduction through the junction in one direction only, commonly termed the forward direction, with negligible conduction permitted in the opposite or reverse direction. Due to this property of rectification these semiconductor devices are ordinarily called semiconductor junction diodes.

When a certain critical voltage or Zener voltage is impressed across the junction in the direction of reverse conduction, a known phenomena called the Zener effect occurs which causes the semiconductor to "break down" and conduct in the reverse direction through the junction. This period of conduction persists as long as reverse voltages are maintained of greater magnitude than the Zener or inverse breakdown voltage characteristic for the particular diode.

If a direct current conducting impedance element, such as a resistor or inductor, is connected in series with a Zener diode and sufficient direct current voltage is applied across these series connected elements in a reverse direction such that the voltage drop across the diode exceeds the predetermined Zener breakdown voltage of the diode, reverse conduction will take place during which any changes in the applied voltage will be developed solely across the resistor. This is due to the Zener effect of the diode wherein the reverse effective resistance thereof varies inversely with the reverse conduction therethrough so that a constant voltage is always maintained across the diode, which voltage is substantially equal to the predetermined Zener breakdown voltage of the diode.

It has been found that the alternating current impedance characteristic of such diodes is also affected when they are operated for reverse conduction. When so operated they have a low impedance to a wide range of alternating current frequencies. In a test set-up, diode 82 with an inverse breakdown voltage characteristic of 10 volts was connected in series with resistor 83 having a resistance of 10 ohms, a direct current voltage of 10.2 volts was applied thereacross to cause 20 milliamperes of direct current to pass through the diode in the reverse direction; when an R.M.S. alternating current voltage of .168 volt was superimposed on the D.C. voltage, the resultant voltage across a load in shunt with diode 82 measured .0047 volt R.M.S. at a frequency of 30 cycles per second, giving an A.C. attenuation ratio of approximately 36 to 1. In contrast, the prior art electrolytic capacitor 71 would need a capacitance of approximately 15,000 microfarads to provide such an attenuation ratio for a frequency of 30 cycles per second. It is also to be noted that the Zener impedance remains fairly constant for frequencies on the order of 30 cycles per second frequency up to about a thousand kilocycles per second, and beyond this range the increased shunt capacity results in an even greater attenuation effect.

In operation of the disclosed embodiment of the invention a D.C. voltage which may gradually vary is applied across the circuit branch consisting of choke 66 and reverse poled diode 81. For a nominal 14.4 volt D.C. vehicle system voltage which is subject to dropping to a minimum of about 12 volts D.C., a Zener diode 81 is selected having a Zener breakdown voltage characteristic so as to be operated continuously with reverse conduction therethrough. The chroke 66 has a given D.C. resistance and therefore D.C. voltage variations are developed thereacross since the D.C. voltage drop across Zener diode 81 remains essentially stable. Choke 66 has an A.C. impedance value greater than the Zener impedance value of diode 81, even for low frequencies, and therefore more of the low frequency interference will be developed across choke 66 than will be developed across diode 81. The partially filtered and stabilized D.C. voltage appearing at the junction of choke 66 and diode 81 is sufficiently modified to be usable in the power amplifier stage and therefore lead 46 is connected at this point to supply power to this stage. It is to be noted that a push-pull type amplifier and a directly coupled loudspeaker are well suited for use with diode 81 since less current is required, resulting in a lower power dissipation ratio for the overall filter circuit.

For the preceding stages of the receiver further filtering and stabilization action is obtained by means of Zener diode 82 and resistor 83. Resistor 83 offers a constant and proportionately high D.C. resistance and A.C. impedance to low frequency interference in comparison to the Zener impedance of diode 82, and thus together they form another voltage divider and regulator network for filtering and stabilizing the direct current. Like the preceding diode 81, the inverse breakdown voltage characteristic of diode 82 is selected to be slightly lower than the normal minimum D.C. potential expected across the diode to insure continuous reverse conduction therethrough. Leads 45 and 51 conduct the fully stabilized and filtered direct current to their respective stages.

In a constructed embodiment of the receiver of FIG. 1, the following circuit constants were used, and these are listed herein merely by way of example and are not intended to limit the invention.

| | |
|---|---|
| Normal direct current voltage of the vehicle electrical system | 13.2 volts D.C. |
| Normal gradual variation in system voltage | +12–15 volts D.C. |
| Capacitor **64** | .5 microfarad. |
| Filter choke **66** | 20 millihenries. |
| Zener diode **81** | 50 watt, 11.8 volt. |
| Resistor **83** | 150 ohms. |
| Zener diode **82** | 750 milliwatt, 10.5 volt. |
| Transistor **41** | 2N176. |
| Transistor **42** | 2N176. |
| Tube **17** | 12EG6. |
| Tube **21** | 12AD6. |
| Tube **23** | 12BL6. |
| Tube **27** | 12AE6A. |

The above-described filter and regulator circuit provides a very effective low pass filtering system to eliminate the low frequency components of interference while at the same time providing a stabilized direct current voltage to drive the various stages of the receiver. Consequently, audible rumble and static as well as oscillator deviation problems due to B+ voltage variation are eliminated. High frequency interference filtering action is enhanced over the prior art filters so that direct connection may be made to the B+ line from the low voltage tubes without danger of tube blockage. In addition, Zener effect devices, such as semiconductor junction diodes, are utilized in place of bulky electrolytic capacitors to effect a reduction in size and weight of the receiver while achieving an improved filter output. Due to the inherent characteristics of Zener effect devices, a filter and regulator B+ output may be obtained which is only slightly lower than the input D.C. voltage, an operating factor which is very important when it is desired to energize a radio receiver directly from a low voltage source without voltage step-up.

I claim:

1. In a vehicle radio receiver adapted to be energized directly from the low voltage direct current electrical system of a vehicle providing a nominal potential of the order of 13 volts, which system includes generator means providing electromotive force therefor and which generator means may cause gradual variations in the system potential between given minimum and maximum values, the system also including an ignition circuit which may introduce electrical interference voltages covering a wide range of frequencies, said receiver including in combination, oscillator and amplifying means and also conductor means for supplying low voltage direct current to said oscillator and amplifying means, a regulator and filter circuit including semiconductor means having a predetermined Zener breakdown voltage characteristic lower than the given minimum value of direct current potential of the electrical system, direct current conducting impedance means connected in series with said semiconductor means, means for conducting direct current of at least the given minimum potential from the electrical system across said semiconductor means and said impedance means, such last named minimum potential including said potential variations and electrical interference voltages, said semiconductor means being poled so that the direct current voltage of the system is applied in a reverse direction to said semiconductor means to cause continuous inverse breakdown conduction thereof and a Zener impedance thereacross so that gradual potential variations in the system and also electrical interference voltages are primarily developed across said impedance means, and means for connecting said conductor means of said receiver across said semiconductor means, said semiconductor means and said impedance means serving a primary regulation and filter function without filter capacitors so that regulated and filtered direct current is supplied from said circuit to said oscillator and amplifying means.

2. In radio apparatus adapted to be energized directly from a low voltage direct current vehicular electrical system providing a source of power which may gradually vary in potential between given minimum and maximum values and which may contain electrical interference covering a wide range of frequencies, which apparatus includes conductor means for supplying direct current thereto for powering the same; a regulator and filter network for such apparatus including in combination, semiconductor means having a predetermined Zener breakdown voltage characteristic lower than said given minimum value of direct current voltage of the electrical system, current limiting resistance means connected in series with said semiconductor means, means for applying direct current from the electrical system across said semiconductor means and current limiting resistance means so that said resistance means is at a higher potential than asid semiconductor means, said semiconductor means being poled so that direct current voltage is applied in a reverse direction to said semiconductor means to cause continuous inverse breakdown conduction thereof and thereby provide a Zener impedance characteristic across said semiconductor means so that gradual variations in the system voltage and also electrical interference voltages are primarily developed across said resistance means, said regulator and filter network including no high capacity filter so that both voltage regulator and filter action are provided for low and high frequency variation primarily by said semiconductor means and resistor means without filter capacitors, and means for connecting the conductor means of the apparatus across said semiconductor means so that regulated and filtered direct current is supplied from said network to the radio apparatus.

References Cited in the file of this patent

UNITED STATES PATENTS

| | | |
|---|---|---|
| 1,829,254 | Asch | Oct. 27, 1931 |
| 2,714,702 | Shockley | Aug. 2, 1955 |
| 2,810,071 | Race | Oct. 15, 1957 |
| 2,812,393 | Patrick | Nov. 5, 1957 |
| 2,861,237 | Zelina | Nov. 18, 1958 |
| 2,875,382 | Sandin et al. | Feb. 24, 1959 |
| 2,876,642 | Scorgie | Mar. 10, 1959 |
| 2,896,151 | Zelinka | July 21, 1959 |